April 8, 1969  R. P. SORENSEN  3,436,894
PACKAGING APPARATUS AND METHOD
Filed May 24, 1966

Inventor
Robert P. Sorensen
By McCanna, Morsbach & Pillote
Attys

Inventor
Robert P. Sorensen
By McCanna, Marsback & Pillote
Attys

United States Patent Office 3,436,894
Patented Apr. 8, 1969

3,436,894
PACKAGING APPARATUS AND METHOD
Robert P. Sorensen, Rockford, Ill., assignor to Anderson Bros. Mfg. Co., Rockford, Ill., a corporation of Illinois
Filed May 24, 1966, Ser. No. 554,284
Int. Cl. B65b 3/04, 51/10, 1/04
U.S. Cl. 53—37                                26 Claims

ABSTRACT OF THE DISCLOSURE

The apparatus has a conveyor which advances a number of containers from a container denester past a filler, sealing head, and cutter. The conveyor has a plurality of pivotally interconnected pockets each of which has a plurality of equally spaced pins adjacent the top. The filler, sealing head, and cutter have teeth which mesh with the pins to drive them correlative to the movement of the conveyor. Means is provided for automatically varying the sealing pressure and for disengaging the sealing head from the packages when the conveyor is stopped. At the outlet end of the conveyor are provided a plurality of shoes which move through the open bottom of the receivers to eject the packages. The heat sealing method includes advancing containers and cover stock in a non-uniform motion, sealing in the longitudinal direction during the faster portion, sealing in the transverse direction during the slower portion, and increasing the sealing pressure during the lateral sealing.

---

This invention relates to a packaging apparatus and method.

It is a general object of this invention to provide an automatic packaging apparatus of increased reliability for processing a number of containers simultaneously and continuously through a sequence of functions that may include one or more of the following: dispensing containers, dispensing products, sealing, cutting connections between containers, and removal of the sealed containers.

Another object is to provide a packaging apparatus having a new and useful conveyor means and coordinated with the various operations in a simplified and reliable manner.

Still another object of this invention is to provide an apparatus in accordance with the foregoing object in which the apparatus for performing each operation is operatively connected to the conveyor means.

It is another object of this invention to provide a new and useful method and apparatus for heat sealing covers on packages.

Yet another object is to provide a method and apparatus for heat sealing covers on packages being advanced in a non-uniform or non-linear motion.

A further object is to provide a method and apparatus for heat sealing in which the force during the heat sealing operation is varied to maintain a more constant pressure during the cross seal to thereby effectuate a better seal.

A still further object of this invention is to provide an apparatus for heat sealing covers on packages being advanced by a conveyor and including means for disengaging the apparatus from the packages when the conveyor is stopped.

A yet further object is to provide a new and useful apparatus for separating packages joined by a continuous web.

Other objects and advantages of the present invention will become apparent as the same becomes better understood from the following detailed description when taken in conjunction with the accompanying drawings wherein:

Figures 1, 7, 11, 13:
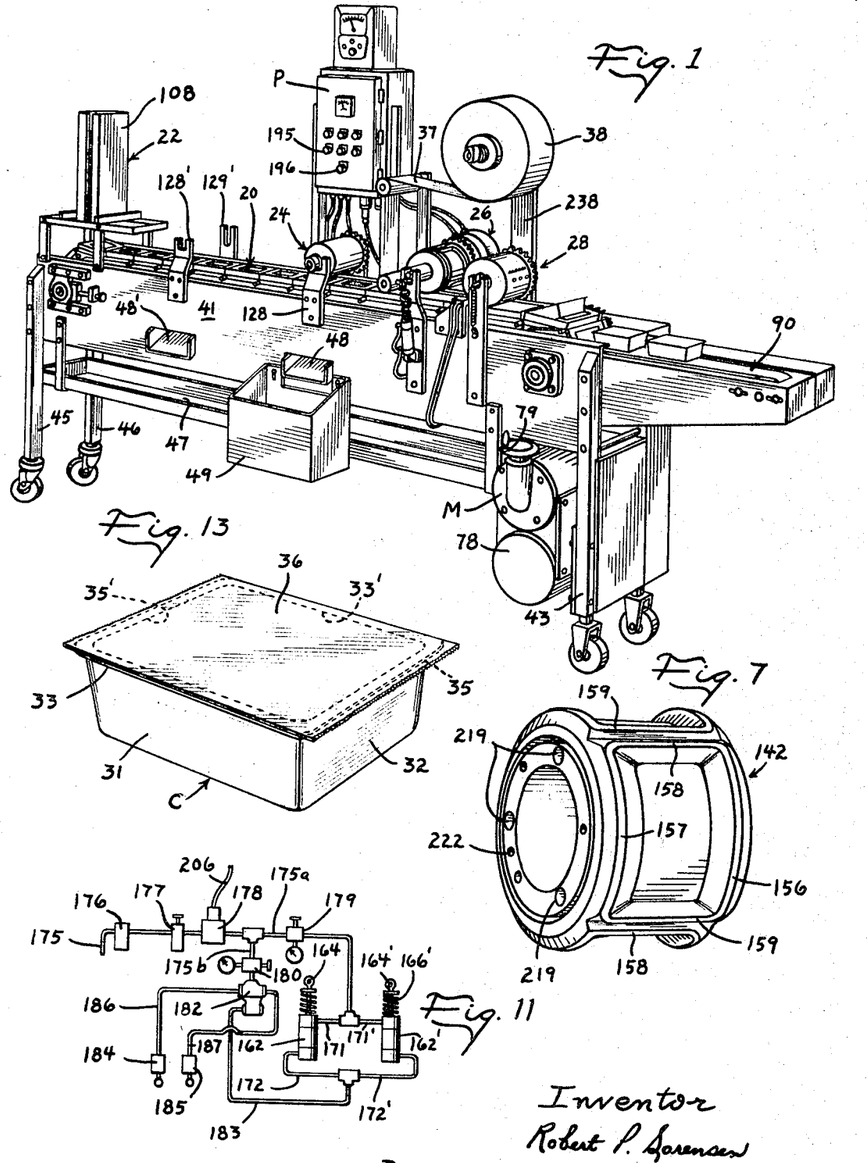
FIG. 1 is a perspective view of an embodiment of this invention.
FIG. 7 is a perspective view of the sealing head.
FIG. 11 is a diagrammatic view of pneumatic controls for the apparatus.
FIG. 13 is a perspective view of a sealed container packaged by this invention.
Figure 2:
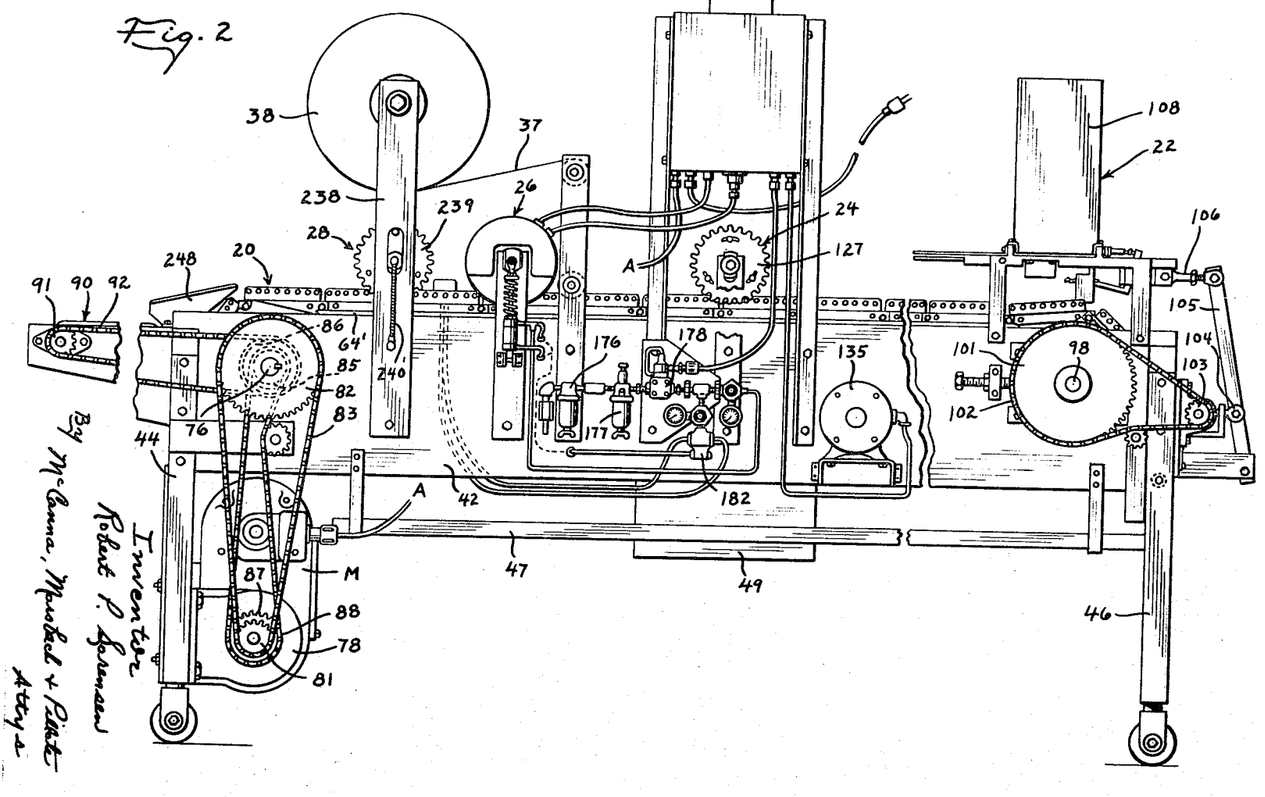
FIG. 2 is a rear elevational view of the apparatus illustrated in FIG. 1.

Reference is now made more particularly to the drawings which illustrate the best presently known mode of carrying out the invention and wherein similar reference characters indicate the same parts throughout the several views. As best shown in FIGS. 1 and 2, an apparatus embodying the present invention includes a conveyor means 20 for advancing a number of containers simultaneously and continuously from a container dispenser or denester 22, past a product dispenser or filler 24, a sealing means 26, and a cutting means 28 to the outlet end of the machine. An exemplary package, containing a dispensed product (not shown), is illustrated in FIG. 13 and includes a container C having a bottom and side walls 31 and end walls 32. At the upper extremity of the side walls are longitudinal rims or flanges 33, 33' and, similarly, at the upper extremity of the end walls are laterally extending rims or flanges 35, 35' which define a generally open top. In the embodiment illustrated in FIG. 1, these containers are dispensed by denester 22, filled with a product by filler 24, and have a cover 36 sealed to the flanges by sealing means 26. The covers 36 are advantageously formed from a thin web 37 of heat-sealable material continuously fed from a roll or supply 38 in a manner hereinafter described. The packages are separated by cutting the web of material in an area between the adjacent containers as by cutting means 28. The general structure of the machine conveniently includes channel-shaped side panels 41, 42 supported on legs 43–46. A drip pan 47 conveniently extends the full length of the machine at the underside thereof and a chute, as at 48, is conveniently located under the filler to direct spilled material to a waste pan 49.

Figures 3, 12:
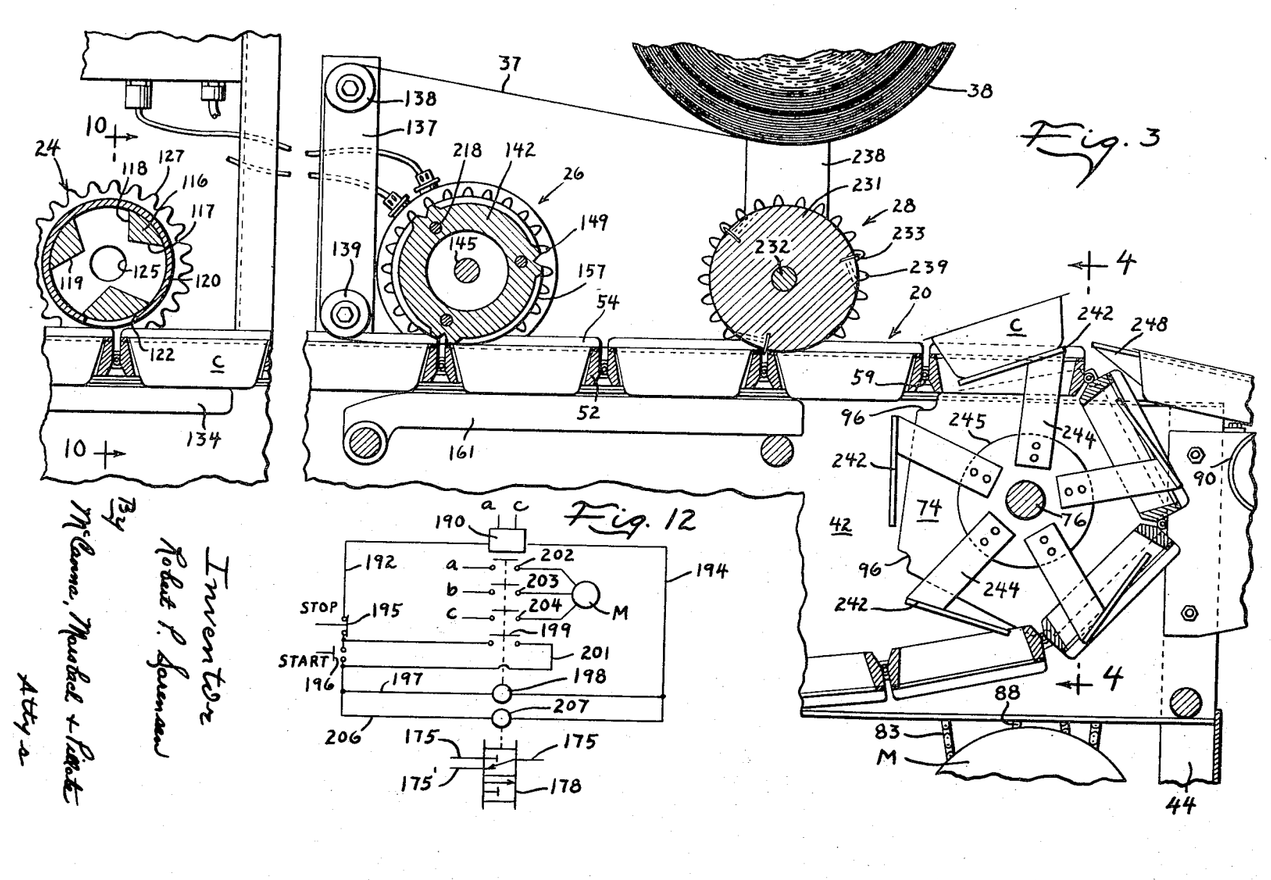
FIG. 3 is a partial longitudinal sectional view taken generally along line 3—3 of FIG. 4.
FIG. 12 is a diagrammatic view of a portion of electrical controls for the apparatus.
Figures 4, 5, 6:
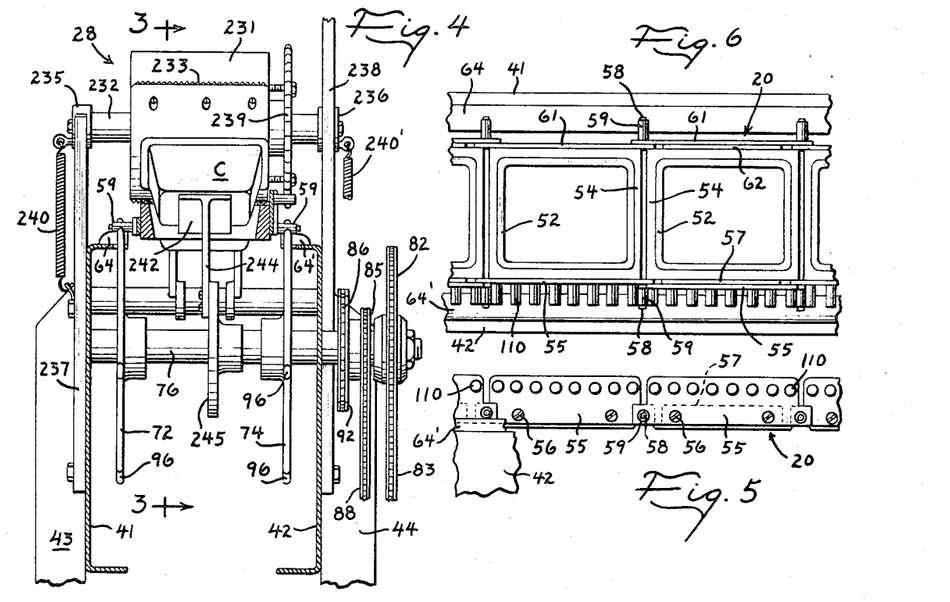
FIG. 4 is a partial cross-sectional view taken generally along line 4—4 of FIG. 3 and having some parts removed for better illustration.
FIG. 5 is a partial rear elevational view of the conveyor.
FIG. 6 is a top view of the apparatus of FIG. 5.

The conveyor means 30 includes a plurality of pockets 52 shaped for receiving the containers C. As illustrated, the pockets may have tapered inner side walls and a generally open bottom which aids in the removal operation. The pockets are shaped to support the flanges of container C on the upper surface 54 of the pockets which preferably comprises a layer of resilient and heat insulating material to aid in the sealing operation, hereinafter described. Preferably, the pockets are swingably connected together in end-to-end relationship to form an endless-type conveyor 20. This is conveniently accomplished by pivotally connecting side plates attached to the pockets. As shown in FIG. 5, a plate 55 is attached to each pocket as by fasteners 56. The plates on alternate pockets are spaced from the side thereof as by a spacer 57 to allow the plates to overlap. The overlapping portions are pivotally connected by a pin connection 58 upon which is mounted a roller 59. In a similar manner as best shown in FIG. 6, plates 61 are mounted on the other side of the pockets with alternate plates being mounted with a spacer plate 62 to provide a similar overlapping relationship. Plates are likewise pivotally connected by pin connection 58 upon which is mounted a roller 59. The upper flight of the conveyor is supported on rails 64, 64' mounted on the upper flange of side panels 41, 42 respectively, and which are arranged for engagement by rollers 59. In this manner, the pockets are supported at both ends during the entire operation with the exception that the rails and a distance past the cutting means 28 less than the spacing of the rollers whereby the rollers adjacent the outlet end drop off the rails (see FIG. 8) just prior to or during the cutting operation to further assure cutting as will hereinafter become apparent. This arrangement also allows the pins to be picked up by driven star wheels 72, 74 (see FIGS. 3 and 4). Star wheels 72, 74 are mounted on driven shaft 76 (FIG. 4) which is driven by motor M. Motor M drives a variable speed drive 78 (see FIG. 1) and there is provided a control handle 79 conveniently disposed adjacent the outside of side panel 41 to allow an operator to easily vary the speed of the machine. The variable speed drive drives shaft 76 through sprcokets 81 and 82 and chain 83 (FIG. 2). As best shown in FIG. 4, sprockets 85 and 86 are rotatably mounted on shaft 76, sprocket 85 being driven by variable speed drive 78 through sprocket 87 and chain 88. Sprockets 85 and 86 are connected and serve to drive an outlet conveyor, generally designated 90, through sprocket 91 and chain 92.

As indicated above, star wheels 72 and 74 drive the conveyor by engaging rollers 59. While other arrangements are possible, the engagement means is herein illustrated as a plurality of generally U-shaped depressions 96 on the periphery of the star wheels. These depressions are generally equally spaced a distance approximating the spacing of the rollers 59. It will be recognized that when shaft 76 is driven at a generally uniform speed, grooves 96 will rotate at a uniform speed; however, the star wheels will transmit a non-uniform or non-linear motion to conveyor 20 since the grooves travel in a semi-circular path while engaged with rollers 59. This non-linear motion is particularly advantageous during the sealing operation hereinafter described. While other numbers of engaging means may be employed, it has been found that a particularly advantageous arrangement embodies five grooves 96 on the periphery of the star wheels, as best seen in FIG. 3. It will be recognized that as the number of engaging means increases, the motion of the conveyor more nearly approximates a linear motion.

Two star wheels of similar construction to that of star wheels 72 and 74 are mounted on shaft 98 adjacent the inlet end of the machine. These star wheels rotate as the conveyor 20 is driven, thereby being driven at a speed correlative to the speed of the conveyor means. As seen in FIG. 2, a sprocket 101 is mounted on shaft 98 for rotation therewith and serves to drive denester 22 in timed relation to the conveyor through chain 102, sprocket 103, and linkage 104–106. Any convenient denester may be utilized or the cartons may be placed in the pockets by a hand operation, however the denesting apparatus 22 herein illustrated is of the type disclosed in detail in Patent No. 3,243,076 issued to L. Strombeck and entitled "Method and Apparatus for Denesting Articles" and reference is made thereto for more complete disclosure of its operation. In general, a stack of nested containers C is supported in magazine 108 (FIGS. 1 and 2). As the denester or carton dispenser is operated in timed relation to the conveyor, the end article is stripped from the stack and allowed to drop off the stack into pocket 52. It should be understood that more than one dispenser may be employed and, if so, the operation of the dispensers is timed with relation to movement of the conveyor so that only one container is deposited into each pocket 52.

Reference is now directed further to the construction of the pockets 52 and particularly to FIGS. 5 and 6. As shown, adjacent the top of plate 55 are a plurality of generally equally spaced teeth shown in the form of laterally extending pins 110. It is deemed obvious that these pins are advanced with the pockets and, as best shown in FIG. 2, a sprocket may be engaged by the pins to drive the filler 24, sealing means 26, or cutting means 28. This arrangement provides a positive relationship between the driven apparatus and the conveyor since the pins or fingers 110 are positively located on each pocket to provide a generally continuous rock which does not become as elongated from wear as in a chain and sprocket arrangement. Other advantages of this arrangement will become apparent from the below description of the various driven apparatus.

Figure 10:
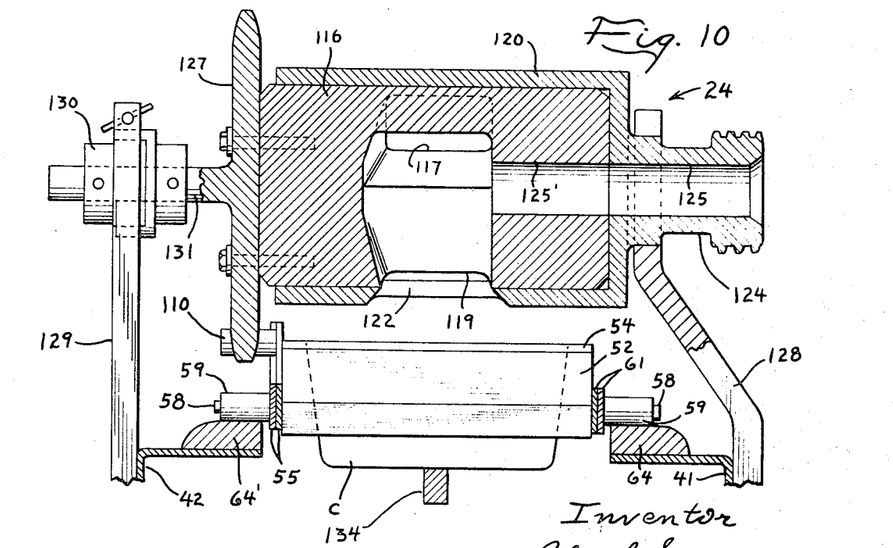
FIG. 10 is a cross-sectional view of the filler taken along line 10—10 of FIG. 3, but showing the valve in dispensing position.

The product dispenser 24 is best illustrated in FIGS. 3 and 10 and includes a rotatable inner valve member 116 having discharge openings or orifices 117–119 therethrough. A non-rotatable outer valve member 120 is disposed around the inner valve member and has a downwardly opening delivery port or nozzle 122 therein. A threaded supply connection 124 extends laterally from outer member 120 for connection to a supply conduit (not shown). Means is provided for controlling the rate of supply of material to filler 24 and for interrupting the flow when the conveyor is stopped. Material flows through passage 125, 125' extending through the supply connection and inner valve member to the discharge orifices. While other arrangements are possible, the passage is at the axis of rotation of inner valve member 116. In the embodiment illustrated, rotation of the inner members about 60° from the position illustrated in FIG. 3 communicates the delivery port and a discharge orifice for discharge or dispensing of material, and an additional 60° rotation interrupts the flow. For this purpose, a sprocket 127 is mounted on inner member 116 to be engaged and driven by pins 110. The product dispenser 24 is conveniently supported on the machine by means of bracket 128 which non-rotatably supports outer member 120, and by bracket 129 and bearing 130 which rotatably supports shaft 131 on sprocket 127 (FIG. 10). As shown in FIG. 1, additional brackets 128', 129' may be provided to accommodate additional product dispensers, if desired.

Inner member 116 is preferably driven in timed relation with the conveyor 20 and, for this purpose, sprocket 127 is mounted on the inner member and has a plurality of teeth (see FIGS. 2 and 3) for engagement by and meshing with pins 110 as advanced by the conveyor. In this manner, inner member 116 is rotated when the conveyor is advanced and at a speed correlative to the speed of the conveyor. It can be seen that this provides a relatively uncomplicated means of driving the inner member in timed relation to the conveyor and, in addition, provides an apparatus where a minor amount of wear on the conveyor does not unbalance said timed relation.

It is contemplated that the above described filler 24 be utilized for dispensing flowable materials in liquid or semi-solid form or having a portion of solids therein. To generally distribute the material dispensed in the container C, a bar 134 (FIG. 3), vibrated by motor 135 (FIG. 2), is advantageously provided to engage the bottom of the containers and generally distribute the material therein by said vibratory action. It is contemplated that other types of materials may be dispensed in other manners without detracting from the invention as embodied in other portions of the apparatus.

At this point in the operation then, filled containers C are being advanced by the conveyor means 20. As previously indicated, a web of material 37 is fed from roll 38 to provide a cover to be sealed on the containers C.

The covers are sealed onto the flanges of each container by sealing means 26, best shown in FIGS. 3 and 7–9. Means is provided for positioning the web 37 adjacent the top of the container and, in the embodiment illustrated, an upright support 137 is supported on the machine in any convenient manner and has laterally extending rollers 138 and 139 mounted thereon. Web 37 is passed over the rollers and is thereby positioned adjacent the tops of the containers for the sealing operation. It is contemplated that one could provide a separate cover feed for individual covers or webs to be heat sealed on the containers C without departing from the principles of the invention. In its preferred form, container C is made of a material capable of having a cover heat sealed thereto. The cover or web 37 is preferably a thermoplastic material of any type compatible with the container being heat sealed and, by way of illustration, includes sheets of synthetic resin and sheets of paper or the like coated with a thermoplastic material.

Figure 9:
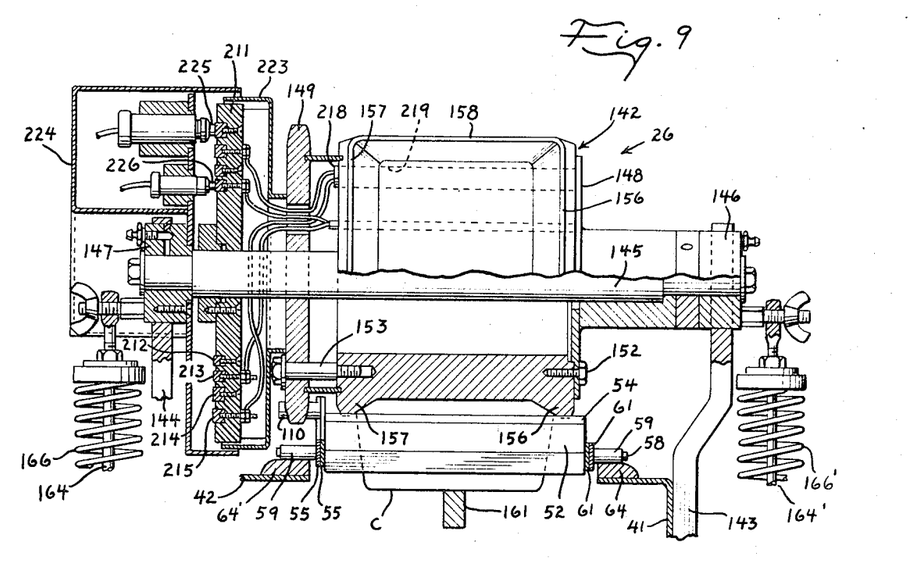
FIG. 9 is a cross-sectional view of the sealing head taken generally along line 9—9 of FIG. 8.

Sealing means 26 includes a rotatable sealing head, generally designated 142, which is conveniently mounted on the machine by brackets 143 and 144 (FIG. 9). A rotatable shaft 145 is supported on the brackets by bearings 146 and 147. A plate 148 and a sprocket 149 are secured to sealing head 142 as by fasteners 152, 153, respectively, for mounting the sealing head on the rotatable shaft 145. The sprocket is arranged for engagement by pins 110 to rotate the sealing head as the conveyor is advanced.

Sealing head 142 is made of heat conductive material and, in the embodiment illustrated, conveniently has three sealing engagement means on its periphery for sealing covers on three consecutive containers. Each sealing engaging means is shaped for overlying the flanges of the container and includes longitudinally extending ribs 156, 157 and laterally extending ribs 158, 159. The ribs are preferably wider toward their base to provide a heat sink to assure sufficient heat for the sealing operation. To aid in the lateral or crosswise sealing, the sealing head is located on the conveyor so that the lateral ribs 158, 159 contact web 37 during the slower portion of the aforementioned non-uniform or non-linear motion of the conveyor. Thus, the sealing head is positioned, as shown in FIG. 3, so that the lateral ribs will perform their sealing function about the time the rollers 59 are picked up by grooves 96. This provides a relative "dwell" of the lateral ribs during the lateral or transverse sealing and the longitudinal sealing is performed during the faster portion of the non-linear motion. Means is advantageously provided for applying downward pressure on the sealing head to depress the web and flanges of the container into resilient material 54 on pockets 52. This tightens the web during sealing and produces a package having a tight sealed cover 36. A longitudinal support bar 161 is conveniently arranged for engaging the container bottoms to provide additional support when the sealing head depresses the flanges. It can be readily seen that all the surface of lateral ribs 158 and 159 is in contact with the web during the sealing operation but only a portion of longitudinal ribs 156 and 157 is in contact. Thus, more force is required to depress into resilient material 54 during lateral sealing than during longitudinal sealing. A particularly advantageous apparatus is provided to achieve this and, in the embodiment illustrated, includes air cylinders 162, 162′ having one end secured to bracket 144 or 143, respectively. The air cylinders each have a movable wall therein (not shown) and a rod 164 or 164′ attached to the wall and extending therefrom. The upper ends of the rods are attached to bearings 147 and 146, respectively (FIG. 9). Compression type springs 166, 166′ are engaged with the rod and the cylinder for a purpose which will hereinafter become apparent. It has been found that about 100# force can be utilized for the lateral sealing and about 50# can be utilized during the longitudinal sealing. This is accomplished by supplying air pressure as through line 171 (FIG. 8) to the upper side of each movable wall and sufficient to apply about 100# force on the sealing head. Likewise, air pressure sufficient to apply about 50# force is supplied to the lower side of each movable wall as through line 172. Thus, it will be appreciated that said forces, when simultaneously applied, counteract each other and result in 50# downward force which is utilized for the longitudinal sealing. For the lateral sealing, means is provided for releasing the air pressure on the lower side of the movable wall thereby allowing the full 100# force to come into operation.

Figure 8:
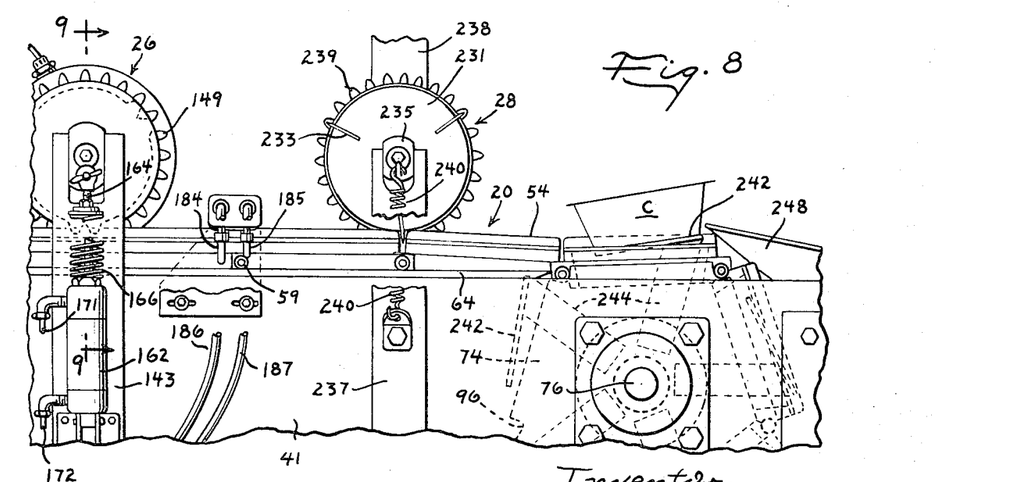
FIG. 8 is a partial front elevational view showing the sealing head and cutting head.

Pneumatic controls for the above operation are diagrammatically illustrated in FIG. 11. Air pressure from a remote source is supplied through conduit 175 and conveniently passes through an air line filter 176, an air line lubricator 177, and a two-way valve 178 whose function will hereinafter become apparent. Supply line 175 is conveniently divided into branches 175a and 175b in which are interposed a high pressure regulator 179 and low pressure regulator 180, respectively, each having a gauge for determination of pressure. This combination assures a clean, accurately regulated air supply, and proper lubrication of air cylinders 162, 162′ and any valves in the system. When the machine is in operation, a constant supply of pressure is applied to the upper side of the air cylinders. As stated above, pressure to the lower side of the cylinder is alternated between 50# force and no force. This is accomplished by a pneumatic control valve, generally designated 182, which operates to alternately feed and release air pressure to lines 172, 172′, connected to line 183. While many types of control valve may be utilized, the air valve 182 illustrated in FIG. 12, is a product of Bellows-Valvair of Akron, Ohio, and known as their "air-poppet valve," Model AP-5B. This control valve is a 4-way valve, preferably controlled and operated by pneumatic power. For this purpose, ports are provided at each end of the valve body and connected to small, normally closed 2-way poppet valves 184, 185 by means of lines 186, 187, respectively. Opening either 2-way valve connected to the respective port bleeds a small amount of air from control valve 182. The corresponding drop in pressure in that end of the valve allows an internal piston (not shown) to shift in that direction and move a 4-way slide valve to which it is engaged. Once shifted, the piston remains in that position until the second 2-way valve is operated. As best shown in FIG. 8, poppet valves 184, 185 are conveniently mounted on side panel 41 for engagement by roller 59 as the conveyor is advanced. These valves are arranged to control the application of pressure to the lower portion of the air cylinders during longitudinal sealing and for releasing the pressure just prior to lateral sealing.

It is preferable, of course, that all pressures be released when the machine is stopped and that the heated sealing head 142 be removed from engagement with web 37. For this purpose, the aforementioned 2-way valve 178 is operated to release the air from both sides of the air cylinders when the machine is stopped. Compression-type springs 166, 166′ then operate to push the sealing head away from the web.

The circuit for controlling 2-way valve 178 is illustrated in FIG. 12. A ground line $b$ and supply lines $a$ and $c$ are shown conveniently supplying 440 volts to a transformer 190 and machine motor M. When current is supplied to the transformer, 110 volts is supplied between supply line 192 and return line 194. A normally closed stop switch 195 and a normally open start switch 196 are interposed in line 192. A convenient location of the start and stop switches on a control panel P is illustrated in FIG. 1. When the start switch is engaged, the circuit is completed from line 192 through line 197 and solenoid 198 to return line 194. The solenoid 198, when energized, closes the normally open relay switch 199 which is connected in parallel with the start switch through line 201. This operates as a holding circuit for the relay to maintain the same energized when the start switch is released and to continuously supply current to the machine until the stop switch 195 is depressed. Simultaneously, solenoid 198 closes normally open switches 202–204 in lines a–c, respectively, leading to machine motor M to start the motor. Also when the start switch is engaged, a circuit is completed from line 192 through line 206 and solenoid 207 to return line 194. Solenoid 207 operates to open normally closed valve 178 to allow air to be supplied to regulators 179 and 180. When the machine is stopped, valve 178 returns to the position shown in FIG. 12 thereby cutting off the supply and allowing air in the system to escape to atmosphere as diagrammatically illustrated at 175'. This releases pressure from both sides of the air cylinders 162, 162' and allows springs 166, 166' to raise sealing head 142 from engagement with the web.

The means for heating the sealing head 142 is illustrated in FIG. 9. A disk 211 of suitable insulating material is rotatably mounted on shaft 145 in any convenient manner. A plurality of concentric conductor rings 212–215 are secured to a face of the disk. A plurality of heating elements 218 are inserted into cavities 219 (FIG. 7) adjacent each cross-seal portion of the sealing head and are connected to rings 214 and 215 by suitable electrical connections as shown. Similarly, a thermostat probe 221 is inserted into cavity 222 and is wired to rings 212, 213. The disk 211 and wiring is conveniently protected by rotatable housing 223 and a stationary housing 224 protects the other side of the disk and the conductor rings. A brush 225 is mounted inside housing 224 for sliding contact with ring 215 and another brush (not shown) is similarly mounted for contact with ring 214. These brushes are wired to supply line 192 and return line 194 to complete the circuit. Likewise, brush 226 and another brush (not shown) are mounted inside housing 224 for sliding contact with rings 212 and 213, respectively. These thermostat brushes are wired to a relay (not shown) at control panel P to maintain the desired temperature of the sealing head.

After the sealing operation, the containers C are connected together by the continuous web of material. As the sealed container is advanced by the conveyor, it pulls web 37 along with it thereby feeding the web for sealing to the following container. It has been found that feeding in this manner provides a more-or-less self-aligning feature in positioning the web over the open top of the containers. It is usually desirable to sever the connection between containers to provide individual packages. For this purpose, a cutting apparatus is arranged between the sealing means 26 and the outlet end of the conveyor as shown in FIGS. 3 and 8. In the embodiment illustrated, the cutting apparatus includes a laterally extending cylinder 231 mounted on shaft 232 and having a plurality of radially extending cutting blades 233 adjustably mounted thereon. Although other arrangements are possible, three such cutter blades are mounted transversely of web 37, and have a length greater than the width of the web. Shaft 232 is mounted on the machine by means of bearings 235 and 236 supported by brackets 237 and 238, respectively (FIG. 4). Bracket 238 conveniently extends upwardly to provide a support for roll 38 as illustrated in FIGS. 1–3. Tension-type springs 240, 240' resiliently urge the cylinder against the sealed packages and provide additional pressure during the cutting operation. A sprocket 239 is mounted on shaft 232 in any convenient manner and affixed to the cylinder 231 for rotation therewith. Sprocket 239 has a plurality of teeth on its periphery for engagement by pins 110 when advanced by the conveyor. It can be seen that the sprocket and pin arrangement positively positions the cutting blades for insertion into the area between adjacent pockets 52 thereby assuring cutting at the proper location. As illustrated in FIG. 3, support bar 161 extends longitudinally to a level below the cutting means to conveniently support the filled containers during this operation. As previously mentioned, rails 64, 64' extend a distance past the cutting apparatus but end a distance less than the spacing of rollers 59. In this manner, the forward roller of a given pocket 52 wil drop off the rails and the pocket will pivot downward slightly about the rear rollers in position under the cutting head (see FIG. 8). This occurs more-or-less during the cutting operation and serves to tension the web 37 if it is not cut and break apart the packages if, for some reason, the web is only perforated by the cutting blades.

At the outlet end of the conveyor is provided a means for ejecting the individual container C from the pockets 52, as illustrated in FIGS. 3 and 4. A plurality of shoes 242 are mounted on shaft 76 by means of arms 244 and mounting plate 245 positioned between star wheels 72 and 74. There is a shoe 242 arranged for moving into each pocket 52. It can be seen that shoe 242, when engaged with containers C as shown in FIGS. 3 and 8, is disposed at an angle to the pocket and extends upwardly toward the outlet end of the conveyor. The upper extremity of the shoe in this position is the first portion to enter the pocket and is arranged to lift the outlet end of the container above the pocket as shown. As the pocket moves around the star wheel, the pockets drop and the other end of the shoe is also disposed near the top of the pocket. A means is provided for receiving the containers as they are so ejected and, in the embodiment illustrated, includes a pair of fingers 248 disposed on either side of the container for engaging the underside of the flange thereof. The fingers 248 are inclined so that the container slides thereon to any convenient receiving means such as the aforementioned outlet conveyor 90.

It is now deemed obvious that there has been provided an apparatus of increased reliability for processing a number of containers simultaneously and continuously through a sequence of functions in a simplified and reliable manner. It is also deemed obvvious that there has been described a new and useful method and apparatus for heat sealing covers on packages. The heat sealing method includes a dwell or pause to aid in the lateral sealing and an increase in pressure during the lateral sealing to further assure a proper seal. The apparatus also advantageously provides means for disengaging the heat sealing means from the packages or web when the conveyor is stopped.

The invention, in its broader aspect, is not limited to the specific steps and apparatus shown and described but departures may be made therefrom without departing from the principles of the invention and without sacrificing its chief advantages.

What is claimed is:

1. In a packaging machine wherein opposed areas of a first and a second stock are to be sealed together, the combination of: conveyor means on the machine for supporting and advancing the first stock along a path past a sealing station, said conveyor means having a plurality of spaced teeth adjacent one side thereof and advanced therewith, means on the machine for positioning the second stock adjacent the first stock prior to sealing, and a sealing head at the sealing station in rolling engagement with the second stock for pressing the second stock against the supported first stock and having a plurality of radially extending teeth meshing with the teeth on the conveyor means for rotating the sealing head as the conveyor means is advanced.

2. An apparatus as set forth in claim 1 wherein the first stock comprises open top containers, and the conveyor means includes a plurality of receiver means shaped for receiving at least one container and arranged longitudinally of the machine with ends in juxtaposition, and means for swingably connecting the receiver means and forming an endless conveyor.

3. An apparatus as set forth in claim 2 wherein the conveyor means has inlet and outlet termini, and the sealing head is arranged for sealing at least a transverse portion of the top of the container, and including wheel means adacent the outlet terminus having a plurality of engaging means on the periphery thereof spaced apart a distance approximating the longitudinal spacing of the receiver means, each receiver means having means thereon for engagement by the engaging means and for entrainment of the conveyor means over the wheel means, means for rotating the wheel means at a generally uniform speed and advancing the receiver means at a non-linear speed, said sealing head arranged for sealing said transverse portion at the slower portion of said non-linear speed.

4. An apparatus as set forth in claim 1 wherein the conveyor means extends longitudinally of the machine, and the sealing head is arranged for heat sealing the first and second stocks in generally longitudinal transverse directions successively as the sealing head is rotated, and including means for holding the sealing head against the second stock with a predetermined amount of force during the longitudinal heat sealing and for increasing said force during the transverse heat sealing.

5. An apparatus as set forth in claim 1 including means for moving the sealing head from position in rolling engagement with the second stock to another position removed from the second stock responsive to stopping the conveyor means.

6. An apparatus as set forth in claim 1 wherein the conveyor means extends longitudinally of the machine, and the sealing head is arranged for heat sealing the first and second stocks in generally longitudinal and transverse directions successively as the sealing head is rotated, and including means for holding the sealing head against the second stock with a predetermined amount of force during the longitudinal heat sealing and for increasing said force during the transverse heat sealing, and means for releasing said force and moving the sealing head from engagement with the second stock responsive to stopping the conveyor means.

7. An apparatus as set forth in claim 1 including a rotatable cutting head for cutting the second stock at preselected intervals and having a plurality of radially extending teeth meshing with the teeth on the conveyor means for rotating the cutting head as the conveyor means is advanced.

8. An apparatus as set forth in claim 1 wherein the first stock comprises open top containers, and the conveyor means advances the containers past a filling station prior to advancing past the sealing station; and including means at the filling station for depositing a product to be packaged in the containers and having a rotatable valve portion disposed above the top of the containers for controlling said product depositing, said valve portion having a plurality of radially extending teeth meshing with the teeth on the conveyor means for rotating the valve portion as the conveyor means is advanced.

9. An apparatus as set forth in claim 8 wherein the conveyor means includes a plurality of receivers shaped for receiving the containers and arranged longitudinally of the machine with ends in juxtaposition, means for swingably connecting the juxtaposed ends of the receivers and forming an endless conveyor having inlet and outlet termini, and including first and second wheel means adjacent the respective outlet and inlet terminus and each having a plurality of engaging means on the periphery thereof spaced apart a distance approximating the longitudinal spacing of the receiver means, each receiver having means thereon for engagement by the engaging means and for entrainment of the conveyor means over the wheel means, means for rotating the first wheel means, means adjacent the inlet terminus for depositing the containers on the receivers, and means operatively connecting the last-mentioned means to said second wheel means for operation as the wheel means is rotated.

10. An apparatus as set forth in claim 1 wherein: the first stock comprises open top rimmed containers having sides and transverse ends connecting the sides; the second stock comprises a strip of cover stock spanning the openings of a plurality of containers; the conveyor means comprises a plurality of generally equally spaced receivers with ends in juxtaposition, means for pivotally connecting the juxtaposed ends, each receiver having a pocket for receiving the containers and having a resilient heat insulating material bordering the top edges thereof so that the container rim is supported on such insulating material, and means for advancing the receivers successively past a filling station, the sealing station, and a cutting station; and the sealing head comprises a cylindrical body having at least one sealing edge on the surface thereof and having a shape approximating the shape of the container rim to seal the cover strip thereto as the sealing head is rotated, means for heating the sealing head, means for holding the sealing edge against the cover strip with a predetermined amount of force during heat sealing to the rims adjacent the container sides and for increasing said force during heat sealing to the rims adjacent the container ends, said force being sufficient to compress the cover strip, rim, and resilient material; and including means for depositing the containers in the receiver pockets prior to advancing to the filling station; means at the filling station for depositing a product in the container and including a rotatable valve portion for controlling said product depositing, means on the valve portion engaging with the teeth on the conveyor means for rotating the valve portion as the conveyor means is advanced; a rotatable cutting head at the cutting station for cutting the cover strip between the spaced containers and having means for engaging the teeth on the conveyor means for rotating the cutting head as the conveyor means is advanced; and means for removing the sealed containers from the conveyor means after the cutting operation.

11. In a packaging machine for operation with open top rimmed containers and a strip of cover stock sealed to the container rims, the combination of: conveyor means on the machine for supporting and advancing the containers in spaced relation past a cutting station, said conveyor means having a plurality of spaced teeth adjacent one side thereof and advanced therewith, and a rotatable cutting head at the cutting station for cutting the cover stock between the spaced containers, the cutting head having a plurality of radially extending teeth meshing with the teeth on the conveyor means for rotating the cutting head as the conveyor means is advanced.

12. An apparatus as set for in claim 11 wherein the conveyor means includes a plurality of receiver means shaped for receiving at least one container and arranged on the machine with ends in juxtaposition, and means for swingably connecting the receiver means and forming an endless conveyor having inlet and outlet termini.

13. An apparatus as set forth in claim 12 wherein the last mentioned means comprises a transverse hinge connection at the juxtaposed ends of the receiver means, each hinge connection having a portion extending beyond each side of the receiver means, longitudinal means on the machine adjacent each side of the receiver means for supporting the extending portions of the hinge connection during the cutting operation, the longitudinal means extending past the cutting station and toward the outlet terminus a distance less than the spacing of the hinge connections and so arranged that the extending portions drop from the longitudinal means.

14. An apparatus as set forth in claim 13 wherein the receiver means has a generally open bottom, and including wheel means adjacent the outlet terminus and having a plurality of engaging means on the periphery thereof for engaging the extending portions of the hinge connections and for entrainment of the conveyor means over the wheel means, and means for rotating the wheel means.

15. In a packaging machine for operation with open top containers, the combination of: conveyor means of the machine for supporting and advancing the containers past a filling station, said conveyor means having a plurality of spaced teeth adjacent one side thereof and advanced therewith, and means at the filling station for depositing a product to be packaged in the containers and having a rotatable valve portion disposed above the top of the containers for controlling said product depositing, said valve portion having a plurality of radially extending teeth meshing with the teeth on the conveyor means for rotating the valve portion as the conveyor means is advanced.

16. An apparatus as set forth in claim 15 wherein the conveyor means includes a plurality of receiver means shaped for receiving at least one container, the receiver means having generally open bottoms and a depth less than the depth of the containers whereby the container bottoms are disposed below the receiver means, and including means at the filling station for engaging the container bottoms and vibrating the same to distribute the product in the containers.

17. An apparatus as set forth in claim 15 wherein the conveyor means advances the containers in spaced relationship successively past the filling station, a sealing station, and a cutting station, and including means on the machine for positioning a continuous web of cover material adjacent the container tops after filling and prior to advancing to the sealing station, a heated sealing head at the sealing station in rolling engagement with the cover material for heating and sealing the same onto the containers, and a rotatable cutting head at the cutting station for cutting the cover material between the spaced containers, the sealing and cutting heads each having a plurality of radially extending teeth thereon meshing with the teeth on the conveyor means for rotating the heads as the conveyor means is advanced.

18. In a machine for advancing containers along a longitudinal path, the combination of: A longitudinally extending endless conveyor having inlet and outlet termini and including a plurality of receivers shaped for receiving at least one container and arranged with ends in juxtaposition, pivotal interconnecting means at each juxtaposed end and having a lateral portion adjacent the lower edges of the receivers and extending beyond each side of the receivers, first and second means at the respective outlet and inlet termini and adjacent the receiver sides for engaging the lateral portions and entraining the conveyor over the first and second means, means for driving one of the first and second means thereby advancing the conveyor, a plurality of generally equally spaced rack teeth rigid with each receiver and adjacent the upper edge thereof, and a mechanism engaged with the spaced teeth and driven thereby in timed sequence with the movement of the conveyor.

19. In a packaging machine having means for supporting and advancing a first stock past a station for heat sealing cover stock thereto, the combination of a rotary heat sealing head having spaced circumferential heat sealing ribs for engaging the cover stock and at least one crosswise sealing rib extending between the circumferential ribs, and means for applying a preselected force to the sealing head while the circumferential ribs are in rolling engagement with the cover stock to press the stocks together and for increasing said force during the crosswise sealing.

20. An apparatus as set forth in claim 19 wherein the first stock comprises a flanged container and the second stock comprises a thermoplastic web, and wherein the sealing ribs have an engaging surface of a width less than the width of the container flanges and arranged for heat sealing the web to the flanges intermediate the edges of the flanges.

21. A method of heat sealing a cover stock to a base stock in generally transverse and longitudinal directions, including the steps of: longitudinally advancing the stocks in juxtaposition at a non-linear motion comprising a faster portion and a slower portion, heat sealing the stocks in the longitudinal direction during the faster portion of the motion, and heat sealing the stocks in the transverse direction during the slower portion of the motion.

22. A method of heat sealing as set forth in claim 21 wherein the sealing is performed by a sealing head, and including applying pressure to the sealing head to press the stocks together during sealing in the longitudinal direciton and increasing the pressure during sealing in the transverse direction.

23. A method of heat sealing as set forth in claim 22 wherein the sealing head is in rolling engagement with the cover stock, and including rotating the sealing head correlative to said non-linear motion.

24. The combination of claim 18 wherein said mechanism is disposed above the conveyor for performing an operation on each container as the containers are moved along the path, and the mechanism having a set of teeth for meshing with the spaced teeth on the receivers for operating the mechanism in synchronism with the movement of the conveyor.

25. In a machine for advancing containers along a longitudinal path, the combination of: a longitudinally extending endless conveyor having a plurality of receivers shaped for receiving at least one container and arranged with ends in juxtaposition, a plurality of generally equally spaced rack teeth rigid with each receiver, means at each juxtaposed end of the receivers for interconnecting the receivers and providing a generally continuous rack, means for driving the conveyor along the path and thereby advancing the receivers and rack teeth, a mechanism disposed above the conveyor for performing an operation on the containers in the receivers as the conveyor is advanced, and the mechanism having a set of teeth for meshing with the rack teeth to operate the mechanism in synchronism with the movement of the conveyor.

26. In a packaging machine for packaging in open-topped containers, the combination of: an endless conveyor including a plurality of receivers for supporting and advancing the open-topped containers in a predetermined path, each receiver having a plurality of spaced teeth advanced therewith, means for supplying and positioning a covering material adjacent the tops of the containers, and a sealing head for sealing the covering material to the containers, and having a set of teeth for meshing with the spaced teeth on the receivers to operate the sealing head in synchronism with the movement of the conveyor.

References Cited

UNITED STATES PATENTS

| 3,102,626 | 9/1963 | Hanes | 53—184 X |
| 3,126,681 | 3/1964 | Cloud | 53—184 X |
| 3,193,978 | 7/1965 | Bader | 53—39 X |
| 3,246,448 | 4/1966 | Amic | 53—373 |
| 3,283,469 | 11/1966 | McBrady et al. | 53—184 X |

BERNARD STICKNEY, *Primary Examiner.*

ROBERT L. FARRIS, *Assistant Examiner.*

U.S. Cl. X.R.

53—39, 126, 266, 373